United States Patent [19]
Amtsfeld

[11] Patent Number: 5,211,449
[45] Date of Patent: May 18, 1993

[54] VEHICLE WITH LIFTABLE FOLLOWING AXLE

[75] Inventor: Joachim Amtsfeld, Hannover, Fed. Rep. of Germany

[73] Assignee: Wabco Standard GmbH, Hannover, Fed. Rep. of Germany

[21] Appl. No.: 872,092

[22] Filed: Apr. 22, 1992

[30] Foreign Application Priority Data
May 7, 1991 [DE] Fed. Rep. of Germany ....... 4114861

[51] Int. Cl.$^5$ ............... B60T 8/38; B60T 8/32; B60T 8/60
[52] U.S. Cl. ............... 303/9.66; 303/7; 303/13; 303/14; 303/98; 303/100; 303/111; 303/119.1; 303/113.2; 303/113.5
[58] Field of Search ............... 303/100, 113 AP, 7, 303/111, 118, 113 TR, 9.66, 13–15, 96, 98, 119 R, DIG. 3, DIG. 4, 119 R, 110; 188/3 R, 3 H, 112

[56] References Cited

U.S. PATENT DOCUMENTS

| | | | |
|---|---|---|---|
| 4,460,220 | 7/1984 | Petersen . | |
| 4,616,881 | 10/1986 | Müller et al. | 303/118 X |
| 4,632,466 | 12/1986 | Grauel et al. | 303/118 X |
| 4,740,041 | 4/1988 | Pannbecker | 303/118 X |
| 4,819,998 | 4/1989 | Goebels et al. | 188/151 A X |
| 4,861,115 | 8/1989 | Petersen | 303/118 X |
| 4,863,221 | 9/1989 | McNinch, Jr. | 303/100 X |
| 4,925,254 | 5/1990 | Holst et al. | 303/100 X |

FOREIGN PATENT DOCUMENTS

| | | |
|---|---|---|
| 2545593 | 4/1977 | Fed. Rep. of Germany . |
| 2614180 | 10/1977 | Fed. Rep. of Germany . |
| 2811999 | 9/1979 | Fed. Rep. of Germany . |
| 3101731 | 8/1982 | Fed. Rep. of Germany . |
| 3138834 | 4/1983 | Fed. Rep. of Germany . |
| 3923955 | 1/1991 | Fed. Rep. of Germany . |

Primary Examiner—Douglas C. Butler
Attorney, Agent, or Firm—Guttman & Rubenstein Marmorek

[57] ABSTRACT

A multi-axle vehicle equipped with an antilock braking system which provides regulated braking operations to prevent locking of the wheels when the vehicle is braked and spinning of the wheels when the vehicle is started up, comprises a front axle, first and second rear axles, the first rear axle being a drive axle and the second rear axle being a liftable following axle, wheels mounted on each of the axles, rotational speed sensors producing signals indicative of the rotational speeds of the wheels associated with each of the wheels mounted on the front axle, on the drive axle, and on the following axle, brake cylinders associated with each of the wheels, a circuit supplying a pressure medium to the brake cylinders so that a braking pressure is applied to the wheels, and at least one electronic control unit which controls the braking pressure applied to each of the wheels. The vehicle also includes a control valve connected to the electronic control unit which causes the braking pressure applied to the following axle wheels to be greater than the braking pressure applied to the wheels on the drive axle during unregulated, partial braking operation. During regulated braking operations, the braking pressure applied to the following axle wheels is the same as the braking pressure applied to the drive axle wheels.

10 Claims, 1 Drawing Sheet

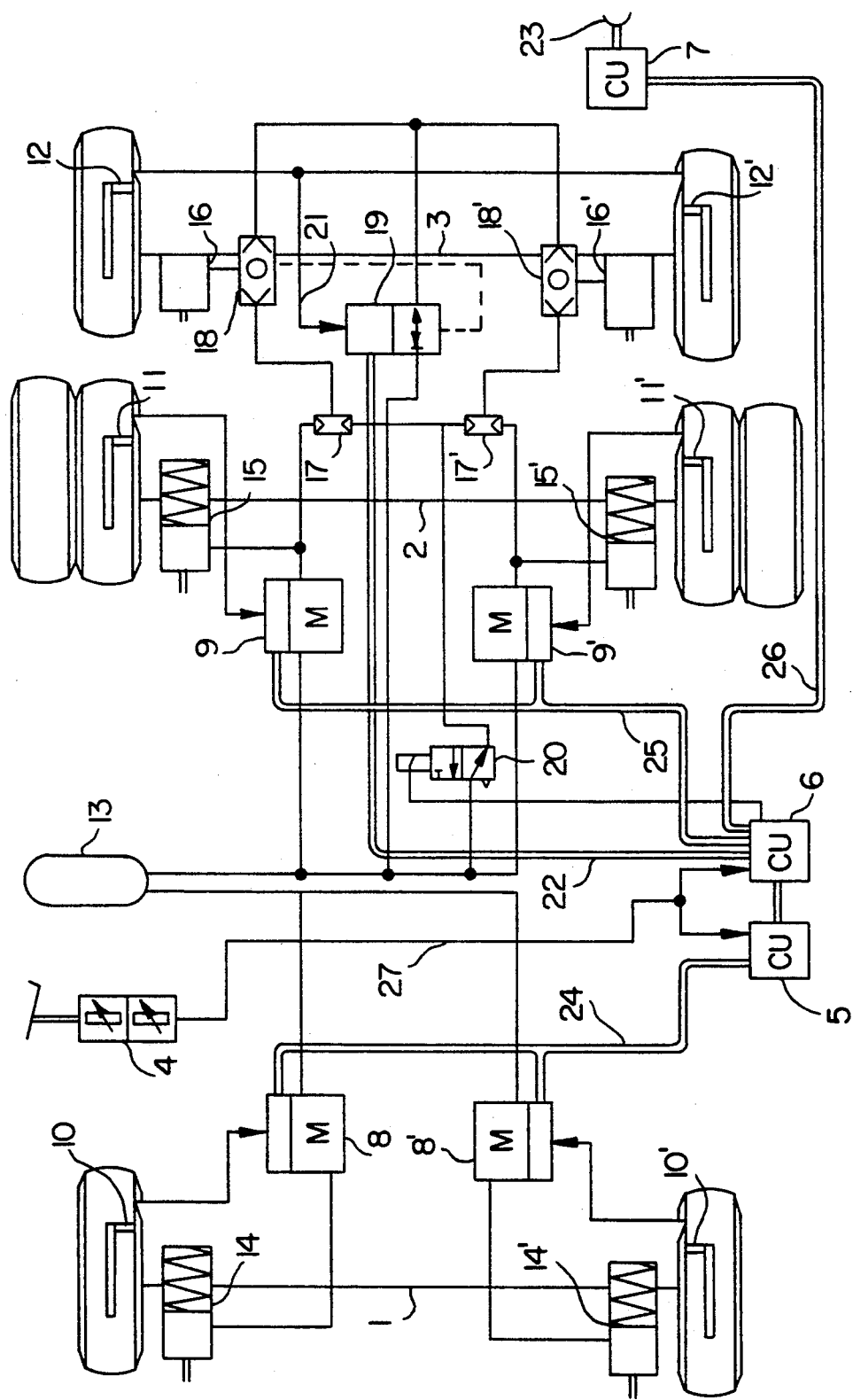

VEHICLE WITH LIFTABLE FOLLOWING AXLE

BACKGROUND OF THE INVENTION

The instant invention relates to a multi-axle vehicle having a front axle and two rear axles, the first rear axle being a drive axle and the second rear axle being a liftable following axle. More particularly, the instant invention relates to a vehicle of this type which is provided with a regulating system for regulating the supply of pressure medium to the brake cylinders associated with the wheels of the vehicle.

A vehicle of the above-mentioned type is known from DE-PS 31 01 731 (U.S. Pat. No. 4,460,220 which is incorporated herein by reference). In this known patent, a pneumatic braking mechanism is disclosed in which the brake cylinders of the following axle are jointly controlled with the brake cylinders of the drive axle. In this vehicle, the first rear axle is a sensing drive axle, i.e., the wheels on this axle are provided with rotational-speed sensors, while the second rear axle is a non-sensing following axle. Therefore, while ABS regulation is in effect, the wheels on the following axle are controlled by the drive (sensed) wheels.

In order to ensure that locking of the wheels on the following axle is prevented when ABS regulation is in effect, the pressure level supplied to the wheels on the following axle is lowered by an intermediary reduction valve. This action causes the wheels on the following axle to be braked with less than full force. The resulting slightly longer braking distance is accepted for the sake of vehicle stability and tire care.

In a commercial vehicle with a liftable following axle, the brake linings on the wheels of the following axle normally wear much more slowly than the linings on the other wheels because the linings on the following axle are not subjected to wear in the lifted state. Such a difference in the extent of wear of the brake linings is not desirable, however, since it is more efficient to replace all brake linings at the same time when the vehicle is being serviced in the workshop.

The instant invention has as its object to ensure approximately even wear of all brake linings in a vehicle with a liftable following axle.

SUMMARY OF THE INVENTION

In accordance with the present invention, a multi-axle vehicle equipped with an antilock braking system which provides regulated braking operations to prevent locking of the wheels when the vehicle is braked and spinning of the wheels when the vehicle is started up, comprises a front axle, first and second rear axles, the first rear axle being a drive axle and the second rear axle being a liftable following axle, wheels mounted on each of the axles, rotational speed sensors associated with each of the wheels mounted on the front axle, on the drive axle, and on the following axle, the rotational speed sensors producing signals indicative of the rotational speeds of the wheels, brake cylinders associated with each of the wheels, a circuit supplying a pressure medium to said brake cylinders so that a braking pressure is applied to the wheels, and at least one electronic control unit which controls the braking pressure applied to each of the wheels. The vehicle also includes a control valve connected to the electronic control unit which causes the braking pressure applied to the following axle wheels to be greater than the braking pressure applied to the wheels on the drive axle during unregulated, partial braking operations. During regulated braking operations, the braking pressure applied to the following axle wheels is the same as the braking pressure applied to the drive axle wheels. In this way, the brake linings of the following axle wheels will wear out at the same rate as the braking linings on the drive axle wheels so that all of the brake linings can be replaced at the same time.

BRIEF DESCRIPTION OF THE DRAWING

The drawing shows a schematic diagram of a preferred embodiment of the invention.

DETAILED DESCRIPTION OF THE INVENTION

The drawing shows the pneumatic and electronic components of a vehicle with an ABS braking system, with drive slip control (ASR), and with a liftable following axle in a simplified schematic representation. The vehicle has three axles, the front axle 1, the first rear axle 2 which is a drive axle, and the second rear axle 3 which is a liftable following axle. The wheels of the front axle 1 have associated with them spring loaded brake cylinders 14,14'. These are connected to the so-called modulators 8,8'. The modulators are connected to a compressed-air reservoir 13. The rotational speed of the wheels of the front axle 1 are scanned by means of rotational-speed sensors 10,10'. The modulators 8,8' contain an electric/pressure (E/P) converter which is able to reproduce pneumatically a brake pressure that is preset electrically.

The modulators 8,8' also contain an electronic portion. The rotational-speed sensors 10,10' are connected to these. The modulators 8,8' are connected via a data bus 24 to an electronic control unit (CU) 5 which is concerned with the front axle 1. The control unit 5 is connected to a second control unit 6 which is concerned with control of the drive axle 2. For this purpose, the control unit 6 is connected by a data bus 25 to modulators 9,9'. An additional control unit 7 is connected via an additional data bus 26 to the control unit 6. The control unit 7 is used mainly for the control of a trailer which can be connected via a connection 23.

The control unit 6 is furthermore connected via a data bus 22 to a proportioning valve 19 (see below).

A braking value indicator 4 is connected to the two control units 5,6. It is actuated by the driver and transmits his braking command over a line 27 to the above-mentioned control units 5,6.

The electronic components of the modulators as well as the control units are provided with one or more microcomputers, i.e., this embodiment is an electronic braking mechanism with "distributed intelligence."

The previously mentioned modulators 9,9' are also supplied from the compressed-air reservoir 13. They serve to set the braking pressure in the brake cylinders 15,15' of the wheels mounted on the drive axle 2. The brake cylinders 15,15' are also made in the form of spring brake actuators. The pneumatic connections of the spring brake actuator part (hand brake) are not shown for the sake of simplicity.

Rotational-speed sensors 11,11' which scan the wheels on the drive axle are connected to the electronic portion of the modulators 9,9'.

The wheels of the following axle 3 are provided with brake cylinders 16,16' without spring brake actuator elements. The speed of these wheels is scanned by means of additional rotational-speed sensors 12,12'.

The above-mentioned rotational-speed sensors 12,12' of the following axle 3 are connected via a line 21 to the electronic portion of the proportioning valve 19 and are thereby also indirectly connected via the data bus 22 to the control units 5,6,7. The brake cylinders 16,16' of the following axle are connected to two-way valves 18,18'. These valves always allow the highest appearing pressure to pass through to the brake cylinders 16,16'. As viewed in the drawing, the right side of each of the valves 18,18' is connected to the output of the proportioning valve 19. The left side of each of the valves 18,18' is connected to the output of a select-low valve 17,17'. These select-low valves always allow the lowest appearing pressure to pass through.

The above-mentioned select-low valves 17,17' are connected on the one hand to the outputs of the modulators 9,9', and to the compressed-air reservoir 13 via a 3/2 multiway valve 20 on the other hand.

The shown compressed-air braking system with ABS and ASR works as follows:

In the partial braking range, the braking requirements of the driver are received by the braking value indicator 4 and are transmitted via the above-mentioned electronic systems to the modulators 8,8' and 9,9'. These convert the preset electrical signal into a corresponding pressure value.

In normal operation, i.e., without drive slip control (ASR) in effect, the 3/2 multiway valve 20 is in its open position (as shown). This has the result that the select-low valves 17,17' allow the braking pressure of the modulators 9,9' to pass through to the two-way valves 18,18' on the way to the following axle 3. The brakes of the following axle 3, however, are also put under pressure at the same time through the proportioning valve 19 via the two-way valves 18,18', and this with a pressure that is approximately 20 to 30% higher than the brake cylinders of the drive axle 2. The lower pressure of the modulators 9,9' is blocked by the two-way valves 18,18'. The information for the higher pressure is transmitted to the proportioning valve 19 via data bus 22. The higher pressure from proportioning valve 19 is conveyed to the brake cylinders 16,16, via the two-way valves 18,18'.

It is advantageous for the proportioning valve 19 to be designed mechanically for a lower frequency than the modulators 8,8' and 9,9' since it need not have any ABS capabilities.

In special cases the pressure from proportioning valve 19 can be set still higher at the following axle, e.g., for up to 50% over-braking.

If the wheels of the drive axle 2 or the wheels of the following axle 3 enter into a state of slippage, this is detected by the associated rotational-speed sensors and is signalled to the electronic systems. If ABS control starts up, the proportioning valve 19 is switched via data bus 22 to exhaust. The braking pressure for the brake cylinders of the drive axle 2 now contributes in controlling the brake cylinders of the following axle 3 via the two-way valves 18,18' and the open select-low valves 17,17'. The brake linings on the drive axle 2 and on the following axle 3 should be designed so that the drive axle is the first to show a locking tendency at identical brake pressures. Thereby, locking of the following axle which is controlled at the same time is prevented. The result is joint control of the brake cylinders.

In case of drive slip control (ASR), the 3/2 multiway valve 20 is changed over so that it goes into locking position. As a result, the select-low valves 17,17' are also locked. The joint control of the brake cylinders of the following axle 3 is thereby inhibited. This is necessary so that when a starting drive wheel is subjected to so-called differential braking, the corresponding wheel of the following axle is not braked together with it. This would naturally affect starting.

When partial braking is again applied, the system switches back to the starting state in which the wheels of the following axle 3 are over-braked by 20 to 30%.

The shown brake system functions of course exactly as if a negative allowance axle were used instead of a following axle 3. Furthermore, it is not important whether the braking system is designed as an electronic braking system with decentralized intelligence, as shown here, or whether only a normal anti-lock braking system with integrated drive slip control having a single electronic control unit is provided.

While the invention has been described by reference to specific embodiments, this was for purposes of illustration only. Numerous alternative embodiments will be apparent to those skilled in the art and considered to be within the spirit and the scope of the invention.

We claim:

1. A multi-axle vehicle having an anti-lock braking system, comprising
   a front axle,
   first and second rear axles, said first rear axle being a drive axle and said second rear axle being a liftable following axle,
   wheels mounted on each of said axles,
   rotational speed sensors associated with each of the wheels mounted on said front axles, on said drive axle, and on said following axle, said rotational speed sensors producing signals indicative of the rotational speeds of their associated wheels,
   brake cylinders associated with each of said wheels,
   a circuit supplying a pressure medium to said brake cylinders so that a braking pressure is applied to said wheels,
   at least one electronic control unit receiving said signals from said rotational speed sensors and regulating the braking pressure applied to said wheels based on the signals received from said rotational speed sensors, and
   control valve means located in said circuit and connected to said electronic control unit causing the braking pressure applied to said wheels mounted on said following axle to be higher than the braking pressure applied to said wheels mounted on said drive axle.

2. The vehicle of claim 1 further comprising a line in said circuit connecting the brake cylinders of the drive axle wheels with the brake cylinders of the following axle wheels, and first and second additional valve means disposed in said line so that the braking pressure applied to said following wheels can be co-controlled by the braking pressure applied to said drive axle wheels during regulated braking operations.

3. The vehicle of claim 1 wherein said control valve means comprises a proportioning valve connected to a source of said pressure medium.

4. The vehicle of claim 1 wherein said braking pressure applied to said wheels on said following axle is about 20 to about 30% higher than the braking pressure applied to said wheels on said drive axle.

5. The vehicle of claim 2 wherein said first additional valve means comprises a select low valve.

6. The vehicle of claim 5 wherein said second additional valve means comprises a two-way valve.

7. The vehicle of claim 1 wherein said control valve means receives information from said electronic control unit via a data bus as to the braking pressure to be applied to said following axle wheels during unregulated partial braking operations and during regulated braking operations.

8. The vehicle of claim 7 wherein said control valve means supplies zero braking pressure to said following axle wheels during regulated braking operations.

9. The vehicle of claim 1 further comprising a 3/2 multiway valve connected to said electronic control unit and disposed between a source of said pressure medium and a select low valve in a line preceding the brake cylinders of said following axle wheels, said electronic control unit causing said 3/2 multiway valve to close when said wheels begin to spin and said electronic control unit enters a condition of regulated drive slip control.

10. The vehicle of claim 1 wherein said electronic control unit causes said control valve means to resume applying overbraking pressure during unregulated partial braking operations after a regulated braking operation is completed.

* * * * *